United States Patent [19]

Beaulier

[11] Patent Number: 4,821,121

[45] Date of Patent: Apr. 11, 1989

[54] ELECTRONIC STILL STORE WITH HIGH SPEED SORTING AND METHOD OF OPERATION

[75] Inventor: Daniel A. Beaulier, Menlo Park, Calif.

[73] Assignee: Ampex Corporation, Redwood City, Calif.

[21] Appl. No.: 18,786

[22] Filed: Feb. 24, 1987

Related U.S. Application Data

[63] Continuation of Ser. No. 740,297, May 31, 1985, abandoned, which is a continuation of Ser. No. 483,327, Apr. 8, 1983, abandoned.

[51] Int. Cl.⁴ .............................................. H04N 5/14
[52] U.S. Cl. ..................................... 358/160; 358/183
[58] Field of Search .............. 358/160, 183, 311, 342, 358/102; 360/35.1, 9.1, 10.1, 14.1

[56] References Cited

U.S. PATENT DOCUMENTS

| | | | |
|---|---|---|---|
| 4,152,722 | 5/1979 | Inuiya et al. | 358/102 |
| 4,172,264 | 10/1979 | Taylor et al. | 358/185 |
| 4,302,776 | 11/1981 | Taylor et al | 358/160 |

FOREIGN PATENT DOCUMENTS 0051305 5/1982 European Pat. Off. ........... 360/14.1

OTHER PUBLICATIONS

Hugh Boyd, "The DLS6000—A New Digital Still Store Library System", International Broadcast Engineer, vol. 11, No. 170, pp. 46-48.

Primary Examiner—Edward L. Coles, Sr.
Assistant Examiner—David E. Harvey
Attorney, Agent, or Firm—Bradley A. Perkins; Ronald C. Fish; George B. Almeida

[57] ABSTRACT

An electronic still store system stores and selectively outputs video image data defining a plurality of signal frame still images. The simultaneous display of up to 16 or more quarter sized images for scanning or sorting by an operator is facilitated by generating a quarter sized copy of each newly received image frame and storing both together on a conventional magnetic disk storage device as is typically employed in general purpose digital computing systems. The quarter sized image can then be recalled directly for a multi-image scan or sort function in which 16 reduced size images are displayed simultaneously without the time delays associated with the retrieval and size reduction of 16 full size images.

15 Claims, 1 Drawing Sheet

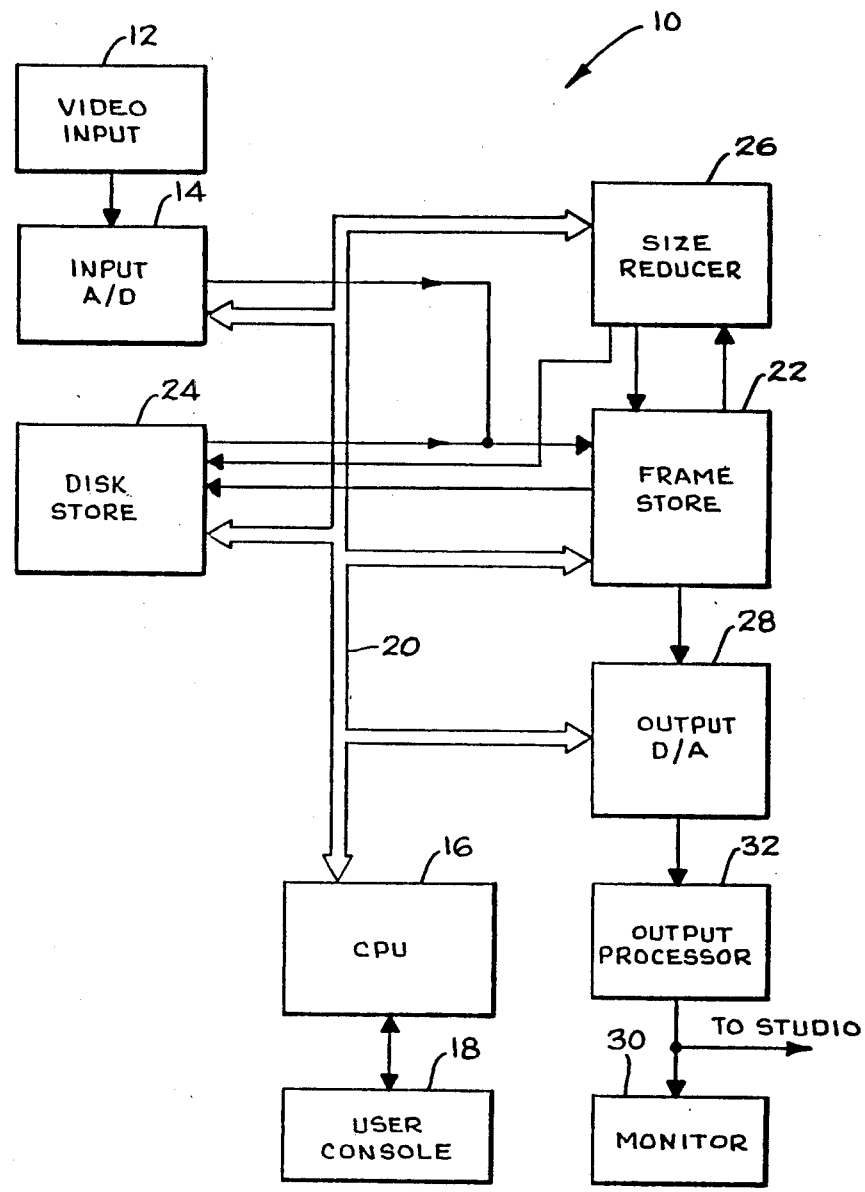

ELECTRONIC STILL STORE WITH HIGH SPEED SORTING AND METHOD OF OPERATION

This is a continuation of application Ser. No. 740,297, filed on May 31, 1985, now abandoned, which is a continuation of application Ser. No. 483,327, filed Apr. 8, 1983, now abandoned.

BACKGROUND OF THE INVENTION

This invention relates to a digital electronic still store for broadcast television signals and more particularly to a still store providing a high speed multiimage scan or sort capability.

Digital electronic still store video display systems store a plurality of frames of video images on relatively low cost magnetic disk storage. Any selected one of the stored image frames may then be communicated to a frame store from which data defining the image is repetitively read out to generate a continuously displayed television image. The still store image can then be combined with a second image to create a combined video image. For example, it is common to insert a selected still store image depicting a news event in the upper left hand corner of a live studio image depicting a newscaster describing the news event.

The disk store is capable of storing a large library of single frame images and it is often desirable to generate a reduced size multiple image picture for editing or other purposes. For example, it might be desirable to create a special effect with multiple images or an editor may wish to view and compare several images at the same time for the purpose of selecting those images which will be used in a television broadcast. However, each of the several images which are to be simultaneously displayed must first be read from the disk store as full size images and then reduced for insertion into the multi-image display. This process takes ¼ to ½ second for each image and results in a delay of several seconds for the composite multi-image display. Such a time delay is at best disconcerting for a busy editor and precludes use of the editing features of the system during a real time broadcast.

U.S. Pat. No. 4,172,264, "Control Arrangement for Video Synchronizers", to Taylor et al describes an arrangement in which joysticks may be used to selectively position video images on a television display. The system requires full sized images to be accessed and then reduced in size as described above.

U.S. Pat. No. 4,302,776, "Digital Still Picture Storage System With Size Change Facility", to Taylor et al discloses a still store system in which multiple images may be accessed and reduced in size for simultaneous display as discussed above. The suggestion is made that an array of reduced size images be stored as a single image frame. This has the effect of eliminating the time required to reproduce the array but precludes the flexibility of choosing or repositioning any desired images when recalling the array. Furthermore, the aforementioned time delays are encountered when assembling the original multi-image display.

SUMMARY OF THE INVENTION

An electronic still store system in accordance with the invention rapidly generates and outputs for display to an operator a still image frame comprising a plurality of selectively positioned, reduce size images which may be simultaneously viewed for scanning or editing purposes. The system includes an image store for storing therein a plurality of frames of video images with both a full spatial resolution copy for full size video output and a reduced spatial resolution copy for reduced size video output of each image being stored, and a frame store which is operable in a first mode to receive from the image store, store and repetitively generate a full spatial resolution output image frame. The frame store is operable in a second mode to receive from the image store and store a plurality of reduced spatial resolution image frames. The frame store is further operable in the second mode to repetitively generate an output image frame having an image from each of the plurality of reduced spatial resolution image frames selectively located at a different position within the output image frame.

The system may further include an image size reducer coupled to produce a quarter size reduced spatial resolution image in response to a full resolution image stored by the frame store, a video input, an analog-to-digital converter coupling the video input to the frame store, a monitor for viewing output video images and an output digital-to-analog converter coupled to convert the output video images from a digital form to an analog form for use by the monitor. A central processing unit is connected to receive user commands through a user console and to control the other devices of the system in response thereto.

The image store employed herein is a general purpose magnetic disk storage system as is currently used in general purpose digital computer systems.

In operation the system can rapidly assemble an array of 16 reduced size images for output as a single image frame. A system operator may view the reduced size images simultaneously for rapid scanning of some or all of the stored images within the image store, which is preferably a magnetic disk. Because the images are read from the image store in reduced size and spatial resolution, the output image formation time is approximately the ¼ to ½ second required to transfer a single full size image instead of the several seconds which would be required to transfer 16 full size images prior to resolution reduction and storage as a reduced size image.

Using this system an operator may rapidly scan many still frame images which are stored by the image store or may compile lists of randomly selected image frames for simultaneous viewing as an array of reduced size images. Because of the rapid response rate the system becomes feasible for development and outputting of data frames containing multiple reduced size images on demand during a television broadcast.

BRIEF DESCRIPTION OF THE DRAWING

A better understanding of the invention may be had from a consideration of the following detailed description taken in conjunction with the accompanying drawing in which the sole FIGURE is a block diagram representation of an electronic still store system in accordance with the invention.

DETAILED DESCRIPTION

Referring now to the sole FIGURE, a digital electronic still store system 10 for rapidly assembling as a single image frame an array of reduced size images is shown as including a video input circuit 12. The video input circuit 12 may be another electronic still store system, a TV camera, or some other source of video data from which one or more frames of a video image may be captured. In the preferred embodiment of the electronic still store system 10, the video signal is processed in component form. A method and apparatus for producing the component information which may be employed is more fully disclosed in the U.S. Pat. No. 4,675,876, issued Sept. 22, 1987 to D. Beaulier, which is assigned to the same assignee as this application, which is incorporated by reference herein. Therefore, the video input 12 will include appropriate video signal decoding means to process video data received from sources that provide the data in an encoded form.

An input analog-to-digital (A-D) converter 14 is coupled to receive an input video signal provided by the video input circuit 12, which typically includes video signal processing circuitry that prepares the signal for conversion by the A-D converter 14. The A-D converter 14 converts the input video signal to a digital form which is suitable for handling and processing by digital circuitry. The input AD 14 receives the video signal from the video input 12 and converts the video signal to the digital sampled data form in which each pixel of video data is represented by three eight bit data bytes defining respectively luminance, red chrominance and blue chrominance components. Conventionally, the chrominance data has half the spatial resolution of the luminance data in the horizontal dimension so that data is produced in a repetitive 4 byte luminance/chrominance component sequence of L1, CR1, CB1, L2—L3, CR3, CB3, L4 and so forth. The single byte representation affords a high dynamic resolution of 256 distinguishable states for each color component. For adequate dynamic resolution, each video component at a sampled data point is preferably defined by at least 6 binary bits providing 64 distinguishable intensities. A central processing unit (CPU) 16 formed from a Z80 microprocessor is connected to receive operator commands from a user console 18. CPU 16 is connected for bidirection communication of commands and other data over a system bus 20. The system bus 20 is connected to input A-D 14 as well as other major components of the still store system 10 to carry the address, mode select and status information required to control the operation of the still store system 10.

A frame store 22 which in the preferred embodiment is a random access memory, is coupled to receive mode control information from CPU 16 over system bus 20 and to receive video data representing a frame of a video image from either input A-D 14 or from a multiple frame image store implemented as a magnetic disk drive store 24 in the preferred embodiment but which can be any bulk storage memory device in other embodiments. Frame store 22 is a random access store that is capable of storing more data than is required for a single video image frame.

The storage capacity provided by presently available 64K memory chips enables storing up to 750 lines of video data. In any event, out of a 525 line NTSC frame of data only about 484 lines represent video data. Because of the two dimensional nature of a video image a quarter size image defined by video data having one-fourth the spatial resolution of a full size image requires one-sixteenth the storage capacity of a full size, full spatial resolution image. A quarter resolution image thus requires the equivalent storage of 30 lines of a full resolution image. In any event the frame store 22 either contains initially or is expanded to contain, storage of video data representing a full resolution full size image, as well as a quarter resolution copy thereof.

A size reducer 26 is connected to be controlled by data from CPU 16 received over the system bus 20. Size reducer 26 is operable to receive video data from frame store 22 to convert the video data to a quarter spatial resolution copy thereof, and communicate the quarter resolution copy back to frame store 22 for storage therein. In a similar fashion, when video data received from disk store 24 does not contain a corresponding quarter spatial resolution copy, size reducer 26 may be employed to generate a quarter spatial resolution copy for subsequent transfer to either frame store 22 or disk store 24. Hence, any time frame store 22 receives a video image frame that does not have a corresponding quarter resolution copy, the size reducer 26 may be used to make such a copy.

As a new frame of video data is transferred from frame store 22 to disk store 24 for more permanent storage, both the full resolution and the quarter resolution copy are transferred. Since the quarter resolution copy is represented by only one-sixteenth the data of a full resolution copy, the communication and storage of the quarter resolution copy imposes only a small burden on both system operating time and extra storage space requirement within disk store 24. It should be noted that disk store 24 is a general purpose magnetic disk storage device as is commonly used in connection with general purpose digital computing systems.

During system 10 operation frame store 22 repetitively accesses stored video data to generate a continuous stream of output video data frames representing the stored image. An output digital-to-analog converter 28 receives this digital output data and converts it to an analog video signal which is subsequently supplied to output processor 32. Output processor 32 is a conventional video signal output processor, for forming a television signal in a standard format, which can be used to drive a monitor 30 for viewing of the output video image by a system monitor. The analog video signal form may also be communicated to studio equipment for further use, broadcasting or storage.

When operating in a first, normal broadcast mode, frame store 22 receives a full resolution frame of video data from disk store 24 and outputs a continuous television image in digital data form in response thereto.

In a second, editing or browsing mode, CPU 16 commands disk store 24 to output reduced resolution image data which is selectively positioned in frame store 22 for viewing in one of 16 reduced size image positions in a 4×4 array as a mosaic which fits within a normal full size image. Under operator control, the 16 viewable images may be taken sequentially from disk store 24 starting with a selected image frame. This mode is useful when scanning all of the images stored by disk store 24. Alternatively, the 16 images may be taken randomly from a list of stored images developed by the operator. This mode is especially useful when it is desired to compare certain images.

The 16 image assembly time is greatly reduced because only an amount of data equivalent to one full size, full spatial resolution, image need be transferred from disk store 24 to define all 16 images. This is only one-sixteenth of the time that would conventionally be required.

While there has been shown and described above, a particular arrangement of an electronic still store system which can rapidly compose a multiple image frame of data, for the purpose of enabling a person skilled in the art to make and use the invention, it will be appreciated that the invention is not limited thereto. Accordingly, any modifications, variations or equivalent arrangements within the scope of the attached claims should be considered to be within the scope of the invention.

What is claimed is:

1. An electronic still store system comprising:
   an image store means for retrievably storing therein a plurality of image frame copies of video frames, the image frame copies comprising data representing full spatial resolution images and corresponding data representing reduced spatial resolution images of the video frames;
   frame store means for receiving and storing in a first mode one of said full spatial resolution images from said image store means and for repetitively generating a full spatial resolution image output, and in a second mode for receiving from the image store means and storing a plurality of said reduced spatial resolution images each at selectively located different positions, the frame store means in the second mode further repetitively generating an image output comprising the stored plurality of said reduced spatial resolution images; and
   size reducer means for receiving from the frame store means the stored full spatial resolution image and in response thereto returning to the frame store means a corresponding reduced spatial resolution image, wherein the frame store means receives and stores the returned reduced spatial resolution image while continuing to store the stored full spatial resolution image.

2. The electronic still store system according to claim 1, wherein the reduced spatial resolution images each have a spatial resolution of one-fourth the spatial resolution of the corresponding full spatial resolution image.

3. The electronic still store system according to claim 1, wherein said frame store means includes a central processing unit, controlled by an operator in said first mode for selecting which of said full spatial resolution images stored in said image store means is to be retrieved from the image store means, and in said second mode for selecting which of said reduced spatial resolution images stored in said image store means are to be retrieved and stored in said frame store means, and further for selecting the different positions within a video frame at which each of said retrieved reduced spatial resolution images is stored.

4. The electronic still store system according to claim 3, wherein said frame store means further comprises an output digital-to-analog converter coupled to receive output image data from the frame store means and in response thereto to generate an analog video signal representing an output image; and
   a monitor coupled to receive the analog video signal and display the output image represented thereby.

5. The electronic still store system according to claim 4, further comprising a video input means for generating an input analog video signal representing an input video image and an analog-to-digital converter coupled between the video input means and the frame store means for converting the input analog video signal to a digital form such that digital data representing said input video image is received and stored by the frame store means.

6. A video still store system comprising:
   external source means for supplying a full size image data set representing a full size image frame;
   a size reducer coupled to receive the full size image data set for producing therefrom a reduced size image data set representing a corresponding reduced size image frame:
   an image store for storing a plurality of full size image data sets representing a plurality of full size image frames and for storing a plurality of reduced size image data sets representing a plurality of reduced size image frames, each of said reduced size image data sets corresponding to one of said full size image data sets; and
   frame store means for storing one of said full size image data sets from either the external source or said image store, wherein if said image store does not supply a corresponding reduced size image data set, said frame store outputs a copy of said full size image data set to said size reducer, and receives in turn a corresponding reduced size image data set;
   wherein said image store stores the reduced size image data set along with the previously stored corresponding full size image data set.

7. An apparatus for storing video pixel data representing video images of a first resolution and, for each each of the images at said first resolution, a corresponding video image at a second resolution, comprising:
   random access memory means for storing video pixel data representing one of a succession of full size images at said first resolution and a corresponding reduced size version thereof at said second resolution;
   bulk memory means for receiving said video pixel data from said random access memory means and for storing said succession of full size images and the corresponding reduced size versions thereof, and for outputting upon a user's command, either a selected one of the successive full size images or selected ones of the corresponding reduced size versions thereof for direct transfer to, and storage back in, said random access memory means; and
   means responsive to said random access memory means for selectively generating one of said corresponding reduced size versions from the respective full size image in said random access memory means, and for transferring the video pixel data representing and the corresponding reduced size version back to the contents of said random access memory means.

8. An apparatus for storing video pixel data as at least one full size image at a first resolution, and at least one reduced size image thereof at a second lower resolution, comprising:
   random access memory means having an input port and an output port, for storing the video pixel data presented at the input port;
   said video pixel data representing the full size video image at a first resolution being stored in a first group of memory locations in said random access memory means;
   bulk storage memory for also storing the video pixel data and for presenting selected groups of video data at said input port for storage by said random access memory means;
   size reducing means responsive to said random access memory means for directly receiving said video pixel data stored in said random access memory means representing said full size image at said first resolution, and for reducing said image to the reduced size image at the second lower resolution, and for supplying said reduced size image at said second resolution directly back to said random access memory means in a second group of memory locations therein;

control means coupled to said random access memory means, to said bulk storage memory and to said size reducing means, for causing said size reducing means to generate said reduced size image at said second resolution and to supply same to said random access memory means in said second group of memory locations; and said control means further causing the transfer of the full size and reduced size video pixel data from said random access memory means to said bulk storage memory for storage, and for causing the selective transfer from said bulk storage memory directly into said random access memory means of either said full size image at said first resolution or said reduced size image at said second lower resolution.

9. The apparatus of claim 8 wherein said size reducing means produces said reduced size image at said second resolution with one fourth the spatial resolution of said full size image at said first resolution, and wherein said control means determines the transfer of said reduced size image at said second resolution into said random access memory means for storage at a selected one of 16 predetermined groups of said memory locations.

10. A system for storing video data representing video images which are displayable as rasters of vertically distributed horizontal lines, each represented video image normally occupying a raster of selected vertical and horizontal size, the system comprising:

a video image size reducer having an input for receiving video data representing a video image corresponding to the selected raster size and for generating video data representing a reproduction of said video image at a selected fractional-size of said selected raster size;

a first store for receiving video data for storage and for providing video data therefrom, said first store having a capacity for storing the video data representing the video image corresponding to the selected raster size simultaneously together with the video data supplied by said video image size reducer representing said reproduction of the video image at the selected fractional-size;

a second store for receiving and storing the video data stored in the first store and for providing video data therefrom directly to the first store, said second store further storing video data representing a plurality of additional video images each corresponding to the selected raster size, and video data representing a plurality of additional reproductions at the selected fractional size of said selected raster size; and means for selectively transferring from said second store directly to said first store either video data representing of the plurality of video images corresponding to the selected raster size, or video data representing a plurality of reproductions at the selected fractional-size of said selected raster size.

11. A method of storing video pixel data comprising:
receiving and storing in selected storage locations in a random access memory, full video pixel data comprising a full size image;

generating from the full video pixel data, reduced video pixel data representing a reproduction thereof in the form of a reduced size image at a lower resolution;

storing the reduced video pixel data representing the reduced size image in additional storage locations in said random access memory along with the full video pixel data;

storing both the full size image and the reduced size image in bulk storage memory; and selectively transferring either the full size image or the reduced size image from said bulk storage memory into said random access memory for further processing.

12. A video still store system comprising:
an external source for supplying a plurality of full size image data sets representative of corresponding full size images;

an image store for storing said full size image data sets, and for storing a like plurality of reduced size image data sets representing a plurality of reduced size images, each of said reduced size image data sets corresponding to one of the full size image data sets;

a memory for simultaneous storage of one of said full size image data sets and a corresponding one of said reduced size image data sets;

a size reducer means for receiving from said memory the stored one of said full size image data sets, and for producing and returning to said memory the corresponding one of said reduced size image data sets;

said memory being responsive to either the external source or the image store for storing said one of said full size image data sets, and for supplying to the image store both the stored one of said full size image data sets and the corresponding one of said reduced size image data sets;

said memory being responsive to the image store to store at different selected locations the plurality of reduced size image data sets;

said memory further supplying as an output image either the plurality of reduced size image data sets arranged at different locations within the output image, or the full size image data set; and means responsive to said memory for displaying the output image as a raster scanned video display.

13. A method of storing video pixel data for access and display comprising:
providing data sets for a plurality of full size images at a first spatial resolution;

generating, from the data sets of the full size images, second data sets representing a corresponding plurality of reduced size reproduction images at a second lower spatial resolution;

storing both the data sets of the plurality of full size images and the data sets of the corresponding plurality of reduced size reproduction images in respective selected groups of storage location; and selectively accessing from the storage locations a data, set representing one of the plurality of full size images, and a data set representing one of the corresponding plurality of the reduced size reproduction images, simultaneously.

14. An apparatus for storing video pixel data as at least one full size image at a first resolution, and at least one reduced size image thereof at a second lower resolution, comprising:

random access memory means having an input port and an output port, for storing the video pixel data presented at the input port;

said video pixel data representing the full size video image at a first resolution being stored in a first group of memory locations in said random access memory means;

bulk storage memory for also storing the video pixel data and for presenting selected groups of video data at said input port for storage by said random access memory means;

size reducing means responsive to said random access memory means for receiving said video pixel data stored in said random access memory means representing said full size image at said first resolution, and for producing reduced size pixel data representing the reduced size image at the second lower resolution, and for supplying said reduced size image at said second resolution to said random access memory means in a second group of memory locations therein;

control means coupled to said random access memory means, to said bulk storage memory and to said size reducing means, for causing said size reducing means to generate said reduced size image at said second resolution and to supply said reduced image to said random access memory means in said second group of memory locations;

said control means further causing the transfer of the full size and reduced size video pixel data from said random access memory means to said bulk storage memory for storage, and for causing the selective transfer from said bulk storage memory into said random access memory means of either said full size image at said first resolution or said reduced size image at said second lower resolution; and wherein said control means also determines the selective transfer of said reduced size image at said second resolution from said size reducing means into said bulk storage memory via the random access memory means.

15. A method of storing video pixel data for access and display comprising:

providing data sets for a plurality of full size image at a first spatial resolution, wherein each one of the full size images occupies upon display a raster of selected vertical and horizontal size;

generating, from the data sets of the full size images, second data sets representing a corresponding plurality of reduced size reproduction images at a second lower spatial resolution;

storing both the data sets of the plurality of full size images and the data sets of the corresponding plurality of reduced size reproduction images in respective selected groups of storage locations;

selectively accessing from the storage locations a data set of one of the plurality of full size images, and one of the sets of the corresponding plurality of the reduced size reproduction images simultaneously;

wherein the step of accessing further includes, retrieving a plurality of reproduction images, storing the retrieved plurality of images in a random access memory, and outputting the stored plurality of retrieved images as a mosaic of reproduction images occupying a raster of the selected vertical and horizontal size.

* * * * *

UNITED STATES PATENT AND TRADEMARK OFFICE
CERTIFICATE OF CORRECTION

PATENT NO. : 4,821,121
DATED : April 11, 1989
INVENTOR(S) : Daniel A. Beaulier

It is certified that error appears in the above-identified patent and that said Letters Patent is hereby corrected as shown below:

Column 6,
Line 46, please delete "and"

Column 8,
Line 61, please delete ","

Signed and Sealed this

Fourth Day of March, 2003

JAMES E. ROGAN
*Director of the United States Patent and Trademark Office*